United States Patent [19]
Griffin

[11] Patent Number: 6,077,591
[45] Date of Patent: Jun. 20, 2000

[54] ELEMENTS FACED WITH SUPERHARD MATERIAL

[75] Inventor: Nigel Dennis Griffin, Whitminster, United Kingdom

[73] Assignee: Camco International (UK) Limited, Stonehouse, United Kingdom

[21] Appl. No.: 09/094,994

[22] Filed: Jun. 15, 1998

Related U.S. Application Data

[63] Continuation-in-part of application No. 08/716,586, Sep. 18, 1996, Pat. No. 5,888,619.

[30] Foreign Application Priority Data

| Sep. 23, 1995 | [GB] | United Kingdom | 9519484 |
| Aug. 21, 1996 | [GB] | United Kingdom | 9617520 |
| Feb. 13, 1998 | [GB] | United Kingdom | 9803007 |

[51] Int. Cl.[7] ............................. B32B 3/00; E21B 10/36
[52] U.S. Cl. ......................... 428/172; 428/133; 428/137; 428/161; 428/192; 428/212; 428/542.8; 175/428
[58] Field of Search ............................ 428/167, 133, 428/137, 161, 120, 212, 192, 172, 542, 8; 175/428, 434; 76/108.2

[56] References Cited

U.S. PATENT DOCUMENTS

| 5,492,188 | 2/1996 | Smith et al. | 175/432 |
| 5,534,329 | 7/1996 | Bunimovich et al. | 428/192 |
| 5,647,449 | 7/1997 | Dennis | 175/434 |

FOREIGN PATENT DOCUMENTS

| 0604211 | 6/1994 | European Pat. Off. . |
| 0659510 | 6/1995 | European Pat. Off. . |
| 0764760 | 3/1997 | European Pat. Off. . |
| 19625509 | 1/1997 | Germany . |
| 2283773 | 5/1995 | United Kingdom . |
| 2290325 | 12/1995 | United Kingdom . |
| 2290326 | 12/1995 | United Kingdom . |
| 2290327 | 12/1995 | United Kingdom . |
| 2290328 | 12/1995 | United Kingdom . |
| 2299109 | 9/1996 | United Kingdom . |
| 2305449 | 4/1997 | United Kingdom . |
| 2327692 | 2/1999 | United Kingdom . |

*Primary Examiner*—Donald Loney
*Attorney, Agent, or Firm*—Jeffery E. Daly

[57] ABSTRACT

A preform element includes a facing table of superhard material, such as polycrystalline diamond, having a front face, a peripheral surface, and a rear surface bonded to the front surface of a substrate which is less hard than the superhard material. The front surface of the substrate is formed around its periphery with an annular rebate having an inner edge, a number of spaced recesses adjacent the inner edge of the rebate, and projections of superhard material integrally formed on the rear surface of the facing table extend into the rebate and recesses.

17 Claims, 5 Drawing Sheets

ELEMENTS FACED WITH SUPERHARD MATERIAL

CROSS-REFERENCE TO RELATED APPLICATION

This is a Continuation-in-Part of U.S. patent application Ser. No. 08/716,586, filed Sep. 18, 1996, by Nigel D. Griffin, entitled "Improvements In Or Relating To Elements Faced With Superhard Material" now U.S. Pat. No. 5,888,619.

BACKGROUND OF THE INVENTION

1. Field of the Invention

The invention relates to elements faced with superhard material, and particularly to preform cutting elements comprising a facing table of superhard material having a front face, a peripheral surface, and a rear surface bonded to a substrate of material which is less hard than the superhard material.

2. Description of Related Arts

Preform elements of this kind are often used as cutting elements on rotary drag-type drill bits, and the present invention will be particularly described in relation to such use. However, the invention is not restricted to cutting elements for this particular use, and may relate to preform cutting elements for other purposes. For example, elements faced with superhard material, of the kind referred to, may also be employed in workpiece-shaping tools.

Preform elements used as cutting elements in rotary drill bits usually have a facing table of polycrystalline diamond, although other superhard materials are available, such as cubic boron nitride and amorphous diamond-like carbon (ADLC). The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be moulded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table.

This may also occur in preform elements used for other purposes, and particularly where the elements are subjected to repetitive percussive loads, as in tappets and cam mechanisms.

Commonly, in preform elements of the above type, the interface between the superhard table and the substrate has usually been flat and planar. However, particularly in cutting elements for drill bits, attempts have been made to improve the bond between the superhard facing table and the substrate by configuring the rear face of the facing table and the front face of the substrate so as to provide a degree of mechanical interlocking between them.

Various configurations of the interface between the superhard facing table and substrate in a preform element are described in British Patent Specifications Nos. 2283773, 2290325, 2290326, 2290327, 2290328 and 2305449.

While some of these existing designs can provide advantages, it may sometimes be found that the projections on the rear surface of the facing table require to project into the substrate to a considerable depth in order to provide an adequate locking function. For example, in some types of preform element the thickness of the substrate may be less than 3 mm, and if the projections on the facing table are extended into the substrate to provide adequate interlocking between the facing table and substrate they may have the undesirable effect of weakening the structure of the substrate. This difficulty might, of course, be overcome by increasing the thickness of the substrate, but not only may thicker preforms be more difficult and costly to manufacture, but difficulties are also likely to arise due to existing manufacturing processes and designs of drill bit already being geared to preforms of the standard thickness.

The present invention sets out to provide a design of preform element where the configuration of the projections on the rear surface of the facing table is such that they provide good interlocking between the facing table and substrate with comparatively small depth of the projections to the rear of the facing table.

Preform elements of the kind to which the present invention relates are usually manufactured by first pre-forming a shaped solid substrate from suitable material, such as tungsten carbide, and then applying to one surface of the substrate a layer of diamond or other superhard particles. The superhard layer then automatically conforms to the shape of the substrate surface, the particles filling any recesses which have been pre-formed in that surface. When the substrate and superhard layer are bonded together in the high pressure, high temperature forming press, the diamond particles bond together and to the substrate, and the rear surface of the superhard facing table becomes integrally formed with projections of superhard material which extend into the recesses in the substrate.

As previously explained, certain characteristics of the finished preform element may depend on the shape and configuration of these superhard projections. However, since the projections are usually, in practice, moulded according to the shape of the pre-formed substrate, it is convenient to define a desired configuration of superhard projections in terms of the shape of the substrate which is required to produce them, and the present invention will therefore be defined in such terms.

SUMMARY OF THE INVENTION

According to the invention there is provided a preform element including a facing table of superhard material having a front face, a peripheral surface, and a rear surface bonded to the front surface of a substrate which is less hard than the superhard material, the front surface of the substrate being formed around its periphery with an annular rebate having an inner edge, a plurality of spaced recesses adjacent said inner edge of the rebate, and a plurality of projections of superhard material integrally formed on the rear surface of the facing table and extending into said rebate and recesses.

In this arrangement, the projection of superhard material which fills the peripheral rebate in the substrate forms a continuous ring of superhard material around the periphery of the facing table, which is of greater depth than the average thickness of the facing table so as to provide the desirable additional strength to the facing table around its periphery. At the same time, the projections of superhard material which fill the recesses of the substrate adjacent the inner edge of the peripheral ring not only reinforce the strength of the peripheral ring but also provide a good mechanical interlock between the facing table and substrate. By providing recesses in the substrate, and hence projections on the facing table, which are of comparatively short length, measured along a radius of the substrate, the interlocking effect provided by the projections may be equivalent to that provided by the deeper projections of the prior art. In the present case the depth of the projections need be no more than the depth of the peripheral ring. This therefore avoids possible weakening of the substrate which may result from the deeper or longer projections of the prior art, and also avoids the manufacturing problems which would result from use of a thicker substrate, as mentioned above.

Preferably the maximum length of each recess, measured along a radius of the substrate, is no greater than twice the maximum width of the recess.

The maximum length of each recess, measured along a radius of the substrate, is preferably no greater than 1.5 times the maximum width thereof, and may be less than the maximum width.

An outer part of each recess may lie on the inner edge of said peripheral rebate, and the bottom wall of each recess may lie at the same level as, and form a continuation of, the bottom wall of the peripheral rebate. Alternatively, the bottom wall of each recess may be disposed at a level above the level of the bottom wall of the peripheral rebate.

Preferably each recess decreases in width as it extends away from the inner edge of the peripheral rebate.

A subsidiary recess may be formed in the bottom wall of the first said recess and may be of corresponding shape to the first said recess, but of smaller size.

Each recess is preferably at least partly curvilinear. For example it may be part-circular or semi-circular.

The preform element as a whole may be circular in configuration and of substantially constant thickness, although other configurations are possible.

The invention includes within its scope a preform element including a facing table of superhard material having a front face, a peripheral surface, and a rear surface bonded to the front surface of a substrate which is less hard than the superhard material, the front surface of the substrate being formed around its periphery with at least one stepped rebate comprising an inner wall and a bottom wall, the inner wall being formed with a plurality of circumferentially spaced recesses into which extend projections of superhard material integrally formed on the rear surface of the facing table.

The front surface of the substrate may be formed with at least two stepped rebates extending around the periphery thereof, each having an inner wall and a bottom wall, each inner wall being formed with a plurality of circumferentially spaced recesses, the recesses in each inner wall being out of radial alignment with the recesses in the inner wall of an adjacent peripheral rebate.

DETAILED DESCRIPTION OF THE PREFERRED EMBODIMENTS

Figure 1:
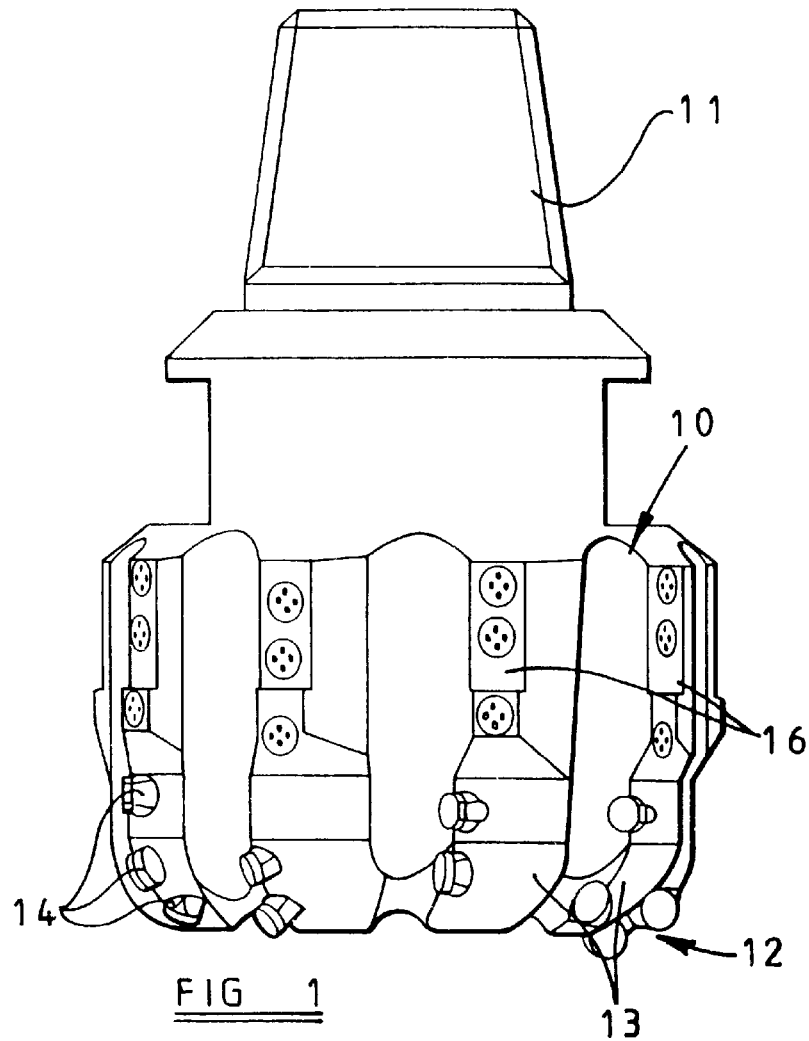
FIG. 1 is a side elevation of a typical drag-type drill bit in which preform elements according to the present invention may be used as cutting elements.
Figure 2:
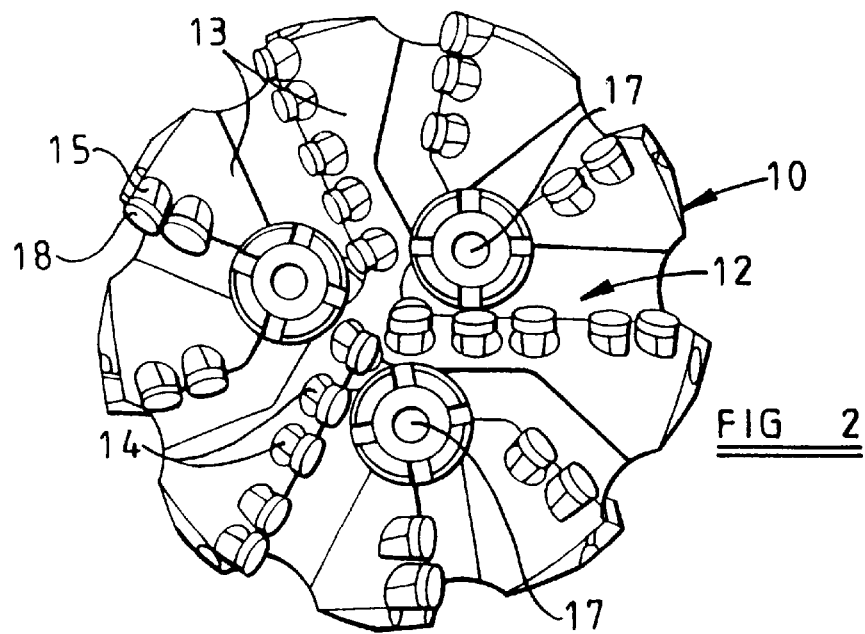
FIG. 2 is an end elevation of the drill bit shown in FIG. 1.

FIGS. 1 and 2 show a typical full bore drag bit of a kind to which cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilise the bit in the borehole. A central passage (not shown) in the bit and shank delivers drilling fluid through nozzles 17 in the end face 12 in known manner.

Each cutter assembly 14 comprises a preform cutting element 18 mounted on a carrier 19 in the form of a post which is located in a socket in the bit body. Each preform cutting element is in the form of a circular tablet comprising a facing table 20 of superhard material, usually polycrystalline diamond, bonded to a substrate 21 which is normally of cemented tungsten carbide. The rear surface of the substrate is bonded, for example by LS bonding, to a suitably orientated surface on the post 19.

Figure 3:
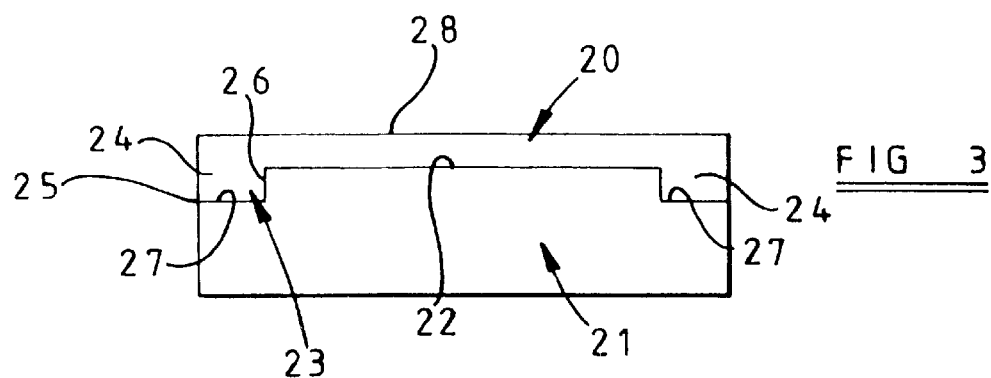
FIG. 3 is a cross-section, on an enlarged scale, of a preform cutting element for use in a drill bit.
Figure 4:
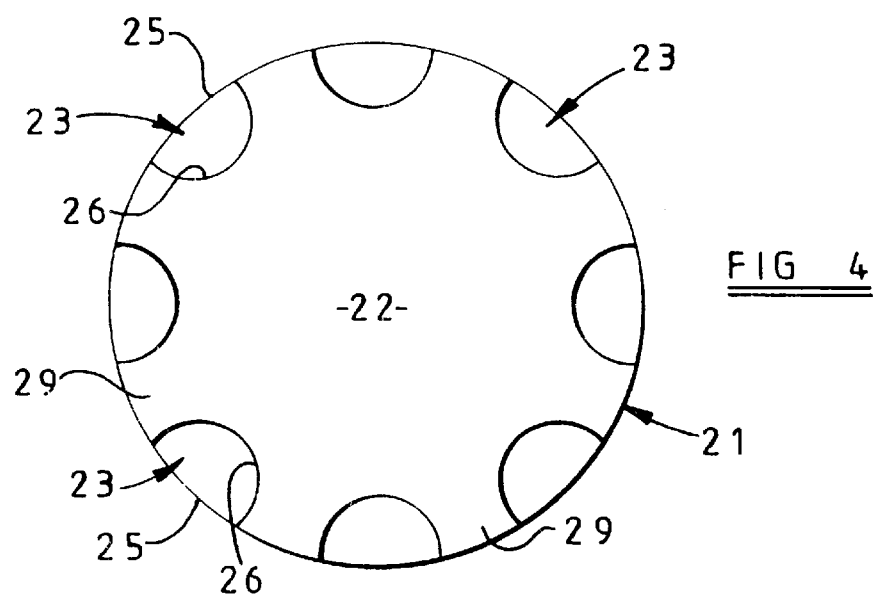
FIG. 4 is a plan view of the substrate of the cutting element of FIG. 3, the superhard facing table which would normally be bonded to the substrate having been removed to show the configuration of the upper face of the substrate.

One form of preform cutting element for a rotary drill bit, in accordance with the invention, is shown in FIGS. 3 and 4.

The front facing table 20 of polycrystalline diamond is bonded in a high pressure, high temperature press to the tungsten carbide substrate 21. The process for making such preform elements is well known and will not be described in detail. Although polycrystalline diamond and tungsten carbide are the most common materials used for such preforms, other suitable materials may also be used. For example, other suitable superhard materials for the facing table are cubic boron nitride and amorphous diamond-like carbon (ADLC).

FIG. 4 shows the front surface 22 of the substrate 21 with the facing table 20 removed to show the configuration of the front surface of the substrate. As may be seen from FIG. 4, the front surface 22 of the substrate is formed around its periphery with eight peripherally spaced recesses 23 into which extend corresponding projections 24 on the underside of the facing table. Each recess has an outer edge 25, which forms part of the periphery of the substrate 21, and a curved semicircular inner edge surface 26. As may be seen from FIG. 4, the maximum length of each recess 23 along a radius of the facing table is less than the width of the recess in the peripheral direction.

The bottom surface 27 of each recess is substantially flat and is parallel to the front surface 28 of the facing table. The depth of each recess is approximately equal to the thickness of the facing table, and it will be seen from FIG. 3 that the combined thickness of the projections 24 and facing table 20 is less than half the overall thickness of the preform element as a whole.

Since the diamond projections 24 which fill the recesses 23 extend around a major part of the outer periphery of the facing table 20, they provide additional strength to that outer periphery in similar manner to the continuous peripheral rings employed in the aforementioned prior art. However, in the present case, unlike the prior art, the material of the substrate 21 extends outwardly between adjacent projections 23, into the regions indicated at 29 in FIG. 4, and thus provide a good mechanical interlock between the facing table and substrate in addition to the added peripheral strength. This mechanical interlock is thus provided within the depth of the equivalent peripheral ring and does not require projections extending beyond the depth of the peripheral ring, as in many of the prior art arrangements. Consequently, the overall depth of the facing table and projections is minimised, and does not therefore lead to reduction in strength of the substrate.

The projections 24 on the facing table 20 thus act in a different manner from the elongate radial and non-radial ribs shown in some prior art arrangements. The fact that the inner edge surfaces of the projections 24 are curved avoids stress concentrations within the substrate from which cracks may be initiated.

Figure 5:
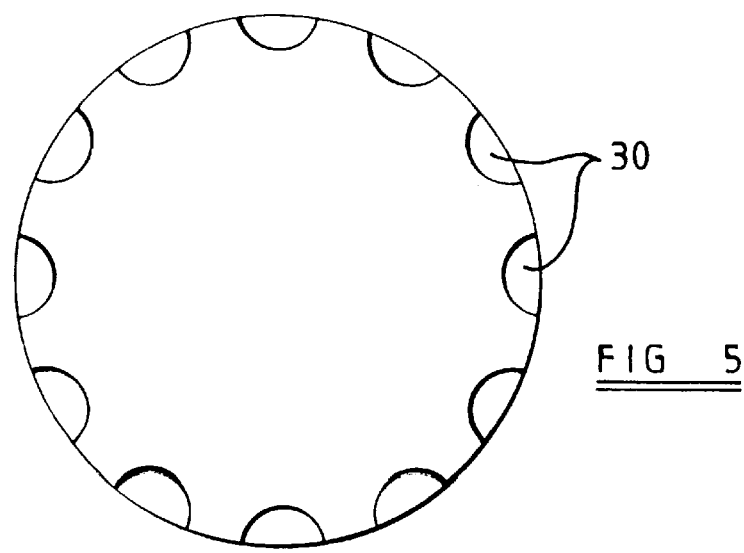
FIG. 5 is a similar view to FIG. 4 of an alternative embodiment.

FIG. 5 shown an alternative arrangement which is similar to the arrangement of FIGS. 3 and 4 except that in this case the recesses 30 are smaller and there are provided twelve such recesses equally spaced around the periphery of the substrate.

Although the recesses 23 and 30 are shown as being equally spaced, the invention includes arrangements where the recesses are non-equally spaced. Also, although in the preferred arrangement the bottom surfaces of the recesses are flat and parallel to the facing table, other shapes and orientations of the bottom surfaces are possible. The recesses may be of varying depths, around the periphery of the facing table, so that the corresponding projections on the facing table project into the substrate to different depths.

Figure 6:
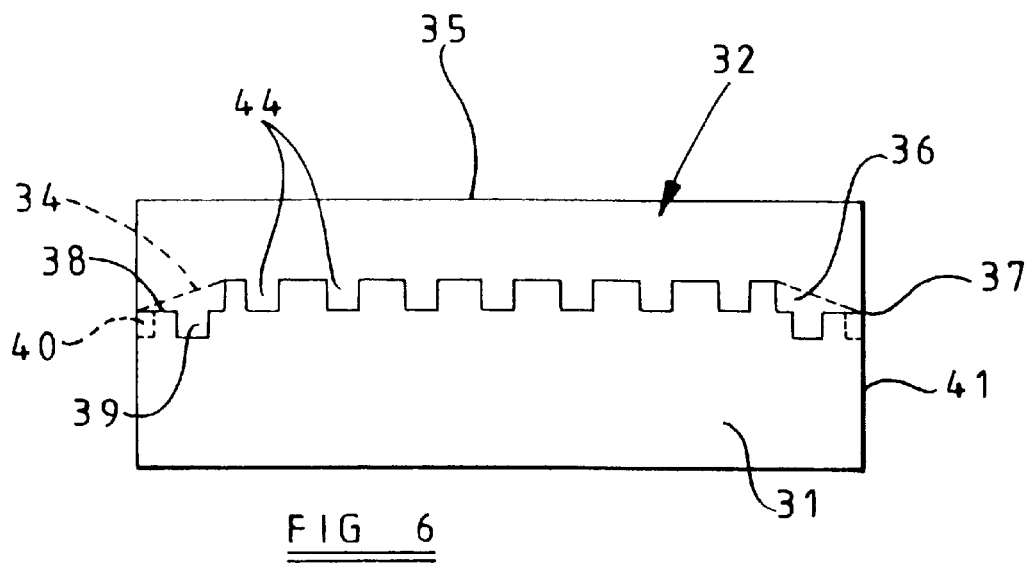
FIG. 6 is a cross-section on an enlarged scale of another form of preform cutting element.
Figure 7:
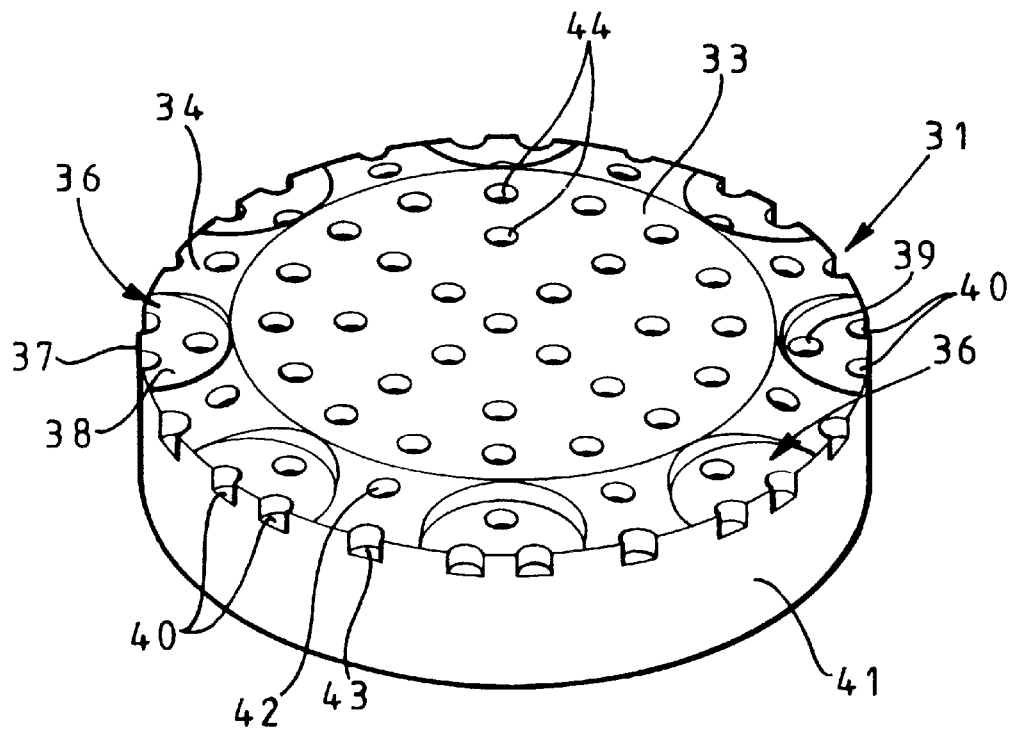
FIG. 7 is a diagrammatic perspective view of the substrate of the cutting element of FIG. 6, the superhard facing table having been removed to show the recesses in the upper surface of the substrate.

Another form of preform cutting element for a rotary drill bit, in accordance with the invention, is shown in FIGS. 6 and 7.

FIG. 7 shows the front surface of the substrate 31 with the polycrystalline diamond facing table 32 removed to show the configuration of the front surface of the substrate. As may be seen from FIG. 7, the substrate 31 is again generally in the form of a circular tablet. However, in this case the upper surface of the substrate, which provides the interface with the diamond facing table 32, comprises a flat circular central region 33 surrounded by an outer annular peripheral region 34 which is part-conical in form so that it is inclined away from the front surface 35 of the facing table as it extends outwardly.

The outer peripheral region 34 is formed with eight part-circular recesses 36 which are spaced equally apart around the periphery of the substrate. The outer edge 37 of each recess 36 is of zero depth and forms part of the peripheral edge of the substrate. The inner curved edge of each recess is tangential to the circular central region 33. The bottom surface 38 of each recess 36 is parallel to the front face 35 of the facing table 32, as best seen in FIG. 6, so that the recess increases in depth as it extends inwardly.

Three subsidiary recesses are formed in the bottom of each main recess 36. These comprise a recess 39 which is completely circular, and two recesses 40 which are semicircular and intercept the outer periphery 41 of the substrate 31. Similar recesses 42 and 43 are also provided in the sloping surface 34 of the substrate between each adjacent pair of main recesses 36.

Similar circular subsidiary recesses 44 are also formed in an array over the central region 33 of the upper surface of the substrate.

The subsidiary recesses 39, 40, 42, 43 and 44 may be all of substantially the same depth or they may vary in depth in different locations over the surface of the substrate. For example, they may vary irregularly and randomly in depth across the surface of the substrate. The numbers, arrangement and shapes of the main recesses 36 and subsidiary recesses are by way of example only, and these recesses may differ in number, shape and arrangement from those shown in the drawing.

In one method of manufacture of the preform element, a solid substrate is first formed in the configuration of FIGS. 4, 5 or 6, or any other configuration in accordance with the invention. The pre-formed substrate is then placed in a high pressure, high temperature press in contact with a layer of diamond particles which fill all the recesses as well as providing a continuous layer across the face of the substrate. In some cases a transition layer of material of intermediate characteristics may be located between the diamond particles and the substrate, in known manner.

The assembly is then subjected to very high pressure and temperature in the press so that the diamond particles become bonded together, with diamond-to-diamond bonding, and also become bonded to the substrate to form the finished element as shown in FIGS. 3 and 6. Accordingly, all of the recesses of the substrate become completely filled with solid protrusions of diamond material which are integral with the facing table 20 or 32 and serve to lock the facing table to the substrate. Since the main recesses 23 and 36 are located at the periphery of the substrate, the diamond material which fills the recesses is exposed at the periphery of the element.

In an alternative method of construction the substrate which is placed in the press with the diamond layer may be of a diameter which is larger than that required for the finished element. In this case the recesses which are closest to the periphery of the substrate, such as the recesses 23, 30, 36, 40 and 43 may initially be complete circular recesses. After formation of the element in the press it is ground down around its periphery to the required final diameter, the grinding removing part of the diamond-filled outer recesses so as to expose the diamond at the outer periphery of the element, as shown in FIGS. 3 and 6.

Figure 8:
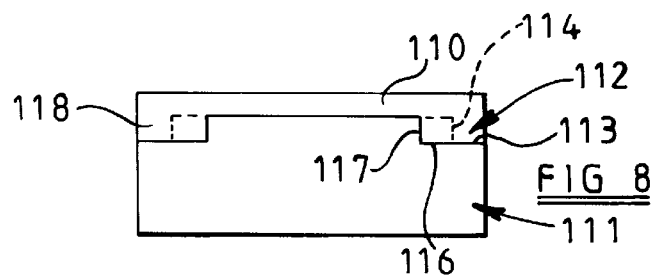
FIG. 8 is a cross-section, on an enlarged scale, of a preform cutting element in accordance with the invention, taken along the Line 8—8 of FIG. 9.

Referring to FIG. 8: the circular cutting element comprises a front facing table 110 of polycrystalline diamond bonded in a high pressure, high temperature press to a tungsten carbide substrate 111. Although polycrystalline diamond and tungsten carbide are the most common materials used for such preforms, other suitable materials may also be used. For example, other suitable superhard materials for the facing table are cubic boron nitride and amorphous diamond-like carbon (ADLC).

As previously described, the preform element is manufactured by first preforming the shaped solid substrate 111 from tungsten carbide, and then applying to the shaped upper surface of the substrate a layer of diamond or other superhard particles. When the substrate and superhard layer are bonded together in the high pressure, high temperature forming press, the diamond particles bond together to form the diamond layer 110 and bond to the substrate 111, the rear surface of the superhard facing table being, in effect, integrally formed with projections of superhard material which extend into the recesses in the substrate.

Figure 9:
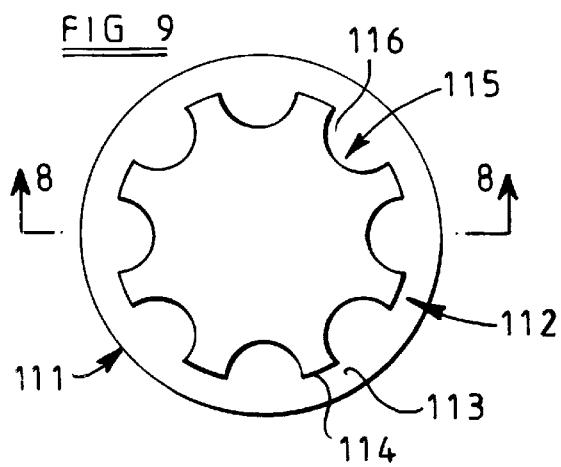
FIG. 9 is a plan view of the substrate of the cutting element of FIG. 8, the superhard facing table which would normally be bonded to the substrate having been removed to show the configuration of the upper face of the substrate.

In the arrangement of FIGS. 8 and 9 the front surface of the substrate is formed around its periphery with an annular rebate 112 having an annular flat bottom wall 113 and an inner side wall 114 which, in the present case, stands up at right angles to the bottom wall 113 although it may also be inclined at an angle greater or less than 90° to the bottom wall.

Eight semi-circular recesses 115 are formed in the inner wall 114 of the rebate and are spaced equally apart around it as shown in FIG. 9. The bottom wall 116 of each recess is at the same level as the bottom wall 113 of the rebate 112 and forms a continuation of it. The wall 117 forming the inner part of each recess 115 extends at 90° to the bottom wall 116 of each recess, as best seen in FIG. 8. Again, however, the wall 117 could be at an angle of greater or less than 90° to the bottom wall.

Since each recess 115 is generally semi-circular in configuration, its maximum length, measured along a radius of the substrate, is approximately half the maximum width of the recess.

As best seen in FIG. 8, the rebate 112 in the substrate 111 is filled with a peripheral ring 118 of polycrystalline diamond which is integrally formed with the facing table 110. This provides an increase in thickness of the facing table around the periphery of the cutting element, thus increasing its strength and impact resistance, as previously described.

At the same time the recesses 115 are also filled with downward projections of polycrystalline diamond integrally formed with the facing table 110, and these projections serve to key the facing table to the substrate by a mechanical interlock as well as reinforcing the outer ring 118.

Weakening of the bond between the facing table and substrate of a preform element often occurs during manufacture as a result of the difference in coefficient of thermal expansion between the material of the substrate and the polycrystalline diamond, the tungsten of the substrate having the greater coefficient. With the present construction the increased expansion of the substrate, due to a rise in temperature during fitting to the drill bit or in subsequent use, causes the portions of the substrate between the recesses 115 to expand and grip laterally the projections of diamond in the recesses 115. This increases the mechanical interlock adjacent the periphery of the cutting element where delamination of the facing table is frequently initiated. The arrangement according to the invention therefore provides strength and impact resistance of the cutting element at its periphery as well as resistance to delamination as a result of temperature change and/or impact.

FIGS. 10–14 are similar views to FIG. 9 showing examples of different shapes of recess which can be employed.

Figure 10:
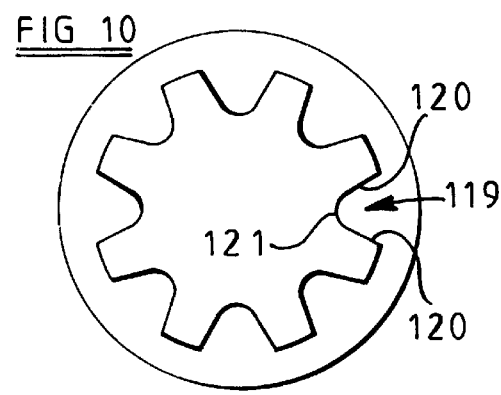
FIGS. 10–14 are similar views to FIG. 9 showing alternative configurations of the substrate.

In FIG. 10 each recess 119 has straight converging sides 120 leading to an inner part-circular end wall 121.

Figure 11:
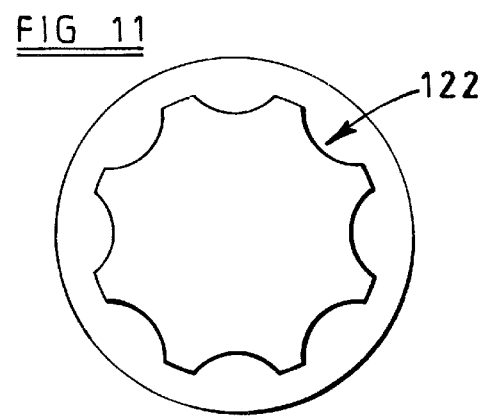

In FIG. 11 each recess 122 is part-circular but is less than a semi-circle.

Figure 12:
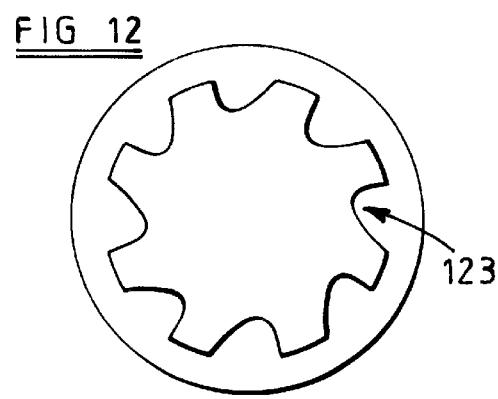

In FIG. 12 each recess 123 is curvilinear but is irregular and asymmetrical.

Figure 13:
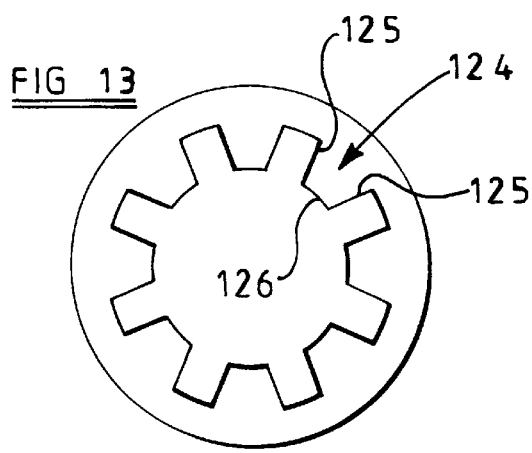

In FIG. 13 each recess 124 has straight converging sides 125 and a straight end wall 126.

Figure 14:
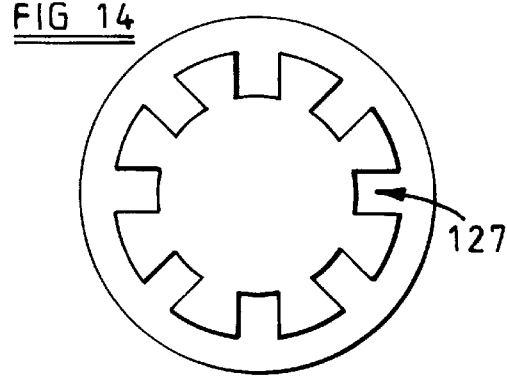

In the arrangements of FIGS. 8–13 each recess reduces in width as it extends inwardly from the inner edge of the rebate 112. This is preferred, but FIG. 14 shows an arrangement where each recess 127 has parallel sides and does not decrease in width as it extends inwardly.

In all of the above arrangements the maximum length of each recess is no greater than twice the maximum width of the recess and is preferably no greater than 1.5× the maximum width. The maximum length of each recess, measured along a radius of the substrate, may be less than the maximum width thereof.

The upper surface of the substrate 111 inwardly of the rebate 112 may be formed with further subsidiary recesses into which extend projections from the rear surface of the diamond facing table 110. Subsidiary recesses may also be formed in the bottom wall 113 of the rebate and/or in the bottom walls 116 of the recesses themselves.

Figure 15:
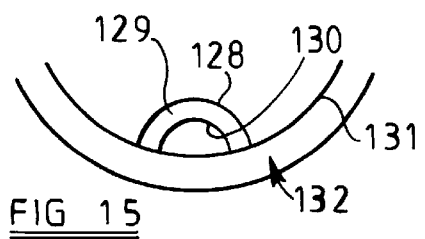
FIG. 15 is a part-view of a modification of the substrate of FIG. 9.
Figure 16:
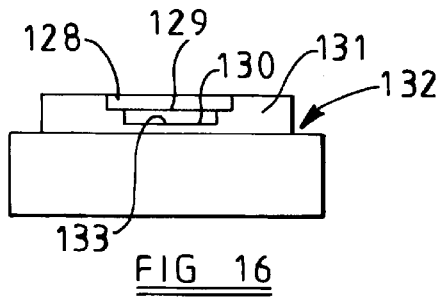
FIG. 16 is a side elevation of the substrate of FIG. 15.

FIGS. 15 and 16 show an arrangement where each recess 128 has formed in its bottom wall 129 a subsidiary recess 130 which is similar in shape to the recess 128 but of smaller size. Both recesses are formed in the inner wall 131 of the peripheral rebate 132 of the substrate.

In this instance the bottom wall 129 of each main recess 128 and the bottom wall 133 of each subsidiary recess 130 are both spaced above the bottom wall of the rebate 132. However, arrangements are possible where the bottom wall of either the main recess or subsidiary recess is on the same level as the bottom wall 124 of the substrate and forms a continuation of it.

Figure 17:
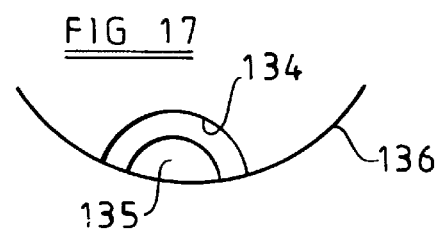
FIGS. 17 and 18 and FIGS. 19 and 20 are similar views to FIGS. 15 and 16 of alternative constructions.
Figure 18:
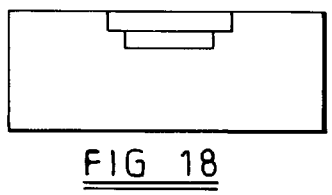

FIGS. 17 and 18 show a modified version of the arrangement of FIGS. 15 and 16 where the peripheral rebate is omitted and each main recess 134 and subsidiary recess 135 open into the outermost peripheral surface 136 of the substrate.

Figure 19:
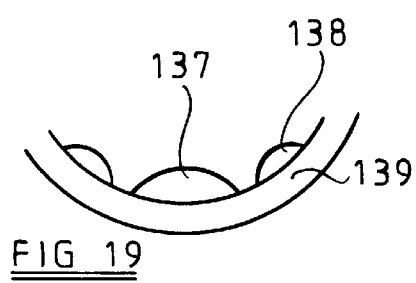
Figure 20:
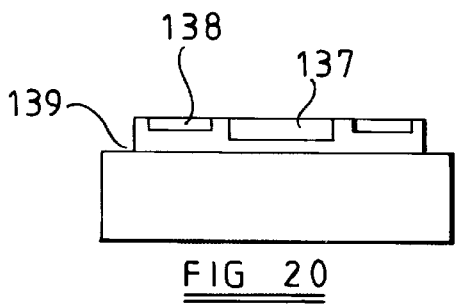

In the above-described arrangements the recesses adjacent the inner edge of the peripheral rebate are of the same size and shape. However, this is not essential and FIGS. 19 and 20 illustrate an arrangement where larger recesses 137 alternate with smaller recesses 138 around the inner wall of the peripheral rebate 139. In this instance the smaller recesses 138 are also of smaller depth than the larger recesses 137, as may be seen from FIG. 20.

In the above-described arrangements there is provided a single stepped rebate extending around the periphery of the substrate. Arrangements are possible where two or more concentric rebates are provided on the substrate, each with recesses adjacent its inner edge, and FIGS. 21 and 22 show one such arrangement.

In this construction the substrate 140 is formed around its periphery with two stepped rebates 141 and 142. Recesses 143 are formed in the inner wall 144 of the outer rebate 141 and smaller recesses 145 are formed in the inner wall 146 of the second, inner rebate 142. The recesses 145 are out of radial alignment with the outer recesses 143. As in the previous arrangements all of the rebates and recesses are filled with projections of diamond or other superhard material integrally formed on the rear surface of the facing table.

Figure 21:
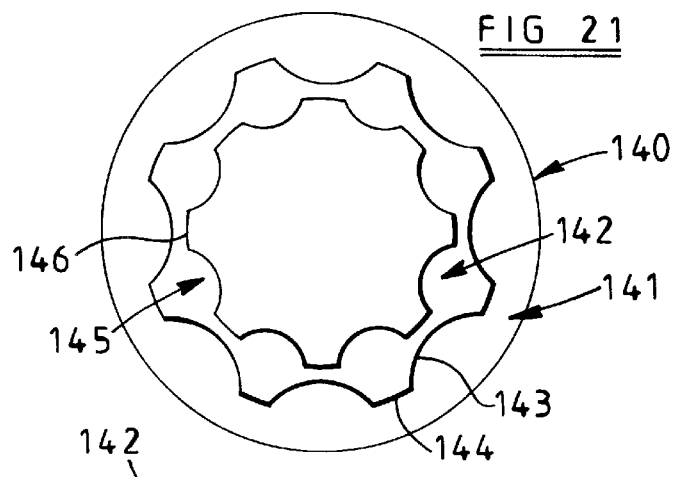
FIG. 21 is a plan view of the substrate of a further form of preform element in accordance with the invention.
Figure 22:
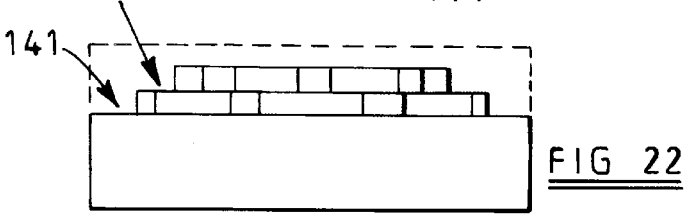
FIG. 22 is a side elevation of the substrate of FIG. 21.

It will be appreciated that many modifications may be made to the arrangement of FIGS. 21 and 22 by changing the size and number of the peripheral rebates and the size, shape and number of the associated recesses. Indeed, the size, shape and number of recesses in any of the above-described arrangements may be varied within the scope of the present invention. For example, the size and spacing of the recesses may be made irregular so as to inhibit the growth of fractures initiated in the cutting element.

It is found that the arrangements shown in the drawings, as well as providing good mechanical interlock and bonding between the diamond table and substrate, also provides a diamond table which is highly resistant to impact loads, particularly at the periphery of the preform element, and is resistant to spalling and delamination of the diamond table from the substrate.

Whereas the present invention has been described in particular relation to the drawings attached hereto, it should be understood that other and further modifications, apart from those shown or suggested herein, may be made within the scope and spirit of the present invention.

What is claimed is:

1. A preform element incuding a facing table of superhard material having a front face, a peripheral surface, and a rear surface bonded to a front surface of a substrate which is less hard than the superhard material, the front surface of the substrate being formed around its periphery with an annular peripheral stepped rebate comprising an inner wall disposed at an angle to the front surface of the substrate and a bottom wall disposed at an angle to the inner wall, the front surface of the substrate being further formed with a plurality of recesses located inwardly adjacent the inner wall of the peripheral rebate and being spaced apart around said inner wall, the rear surface of the superhard facing table being formed with a peripheral rim which extends into the peripheral rebate in the substrate, and a plurality of spaced projections, located inwardly adjacent the peripherial rim, which extend into said recesses in the substate, said recesses in the substrate being curvilinear as they extend inwardly away from the inner wall of the peripheral rebate.

2. A preform element incuding a facing table of superhard material having a front face, a peripheral surface, and a rear surface bonded to a front surface of a substrate which is less hard than the superhard material, the front surface of the substrate being formed around its periphery with an annular peripheral stepped rebate comprising an inner wall disposed at an angle to the front surface of the substrate and a bottom wall disposed at an angle to the inner wall, the front surface of the substrate being further formed with a plurality of recesses located inwardly adjacent the inner wall of the peripheral rebate and being spaced apart around said inner wall, the rear surface of the superhard facing table being formed with a peripheral rim which extends into the peripheral rebate in the substrate, and a plurality of spaced projections, located inwardly adjacent the peripherial rim, which extend into said recesses in the substate, said recesses in the substrate each extending inwardly from the inner wall of the peripheral rebate by a distance which is not greater than the maximum width of the recess.

3. A preform element incuding a facing table of superhard material having a front face, a peripheral surface, and a rear surface bonded to a front surface of a substrate which is less hard than the superhard material, the front surface of the substrate being formed around its periphery with an annular peripheral stepped rebate comprising an inner wall disposed at an angle to the front surface of the substrate and a bottom wall disposed at an angle to the inner wall, the front surface of the substrate being further formed with a plurality of recesses located inwardly adjacent the inner wall of the peripheral rebate and being spaced apart around said inner wall, the rear surface of the superhard facing table being formed with a peripheral rim which extends into the peripheral rebate in the substrate, and a plurality of spaced projections, located inwardly adjacent the peripherial rim, which extend into said recesses in the substate, each said recess having two spaced side walls extending inwardly away from the inner wall of the peripheral rebate and a transverse end wall connecting the two side walls at a location spaced inwardly of the inner wall of the peripheral rebate.

4. A preform element according to claim 1, wherein the maximum length of each recess, measured along a radius of the substrate, is no greater than twice the maximum width of the recess.

5. A preform element according to claim 1, wherein the maximum length of each recess, measured along a radius of the substrate, is no greater than 1.5 times the maximum width thereof.

6. A preform element according to claim 1, wherein the maximum length of each recess, measured along a radius of the substrate, is less than the maximum width thereof.

7. A preform element according to claim 1, wherein an outer part of each recess lies on the inner edge of said peripheral rebate.

8. A preform element according to claim 7, wherein each recess has a bottom wall, and wherein the bottom wall of each recess lies at the same level as, and forms a continuation, the bottom wall of the peripheral rebate.

9. A preform element according to claim 7, wherein each recess has a bottom wall, and wherein the bottom wall of each recess is disposed at a level above the level of the bottom wall of the peripheral rebate.

10. A preform element according to claim 7, wherein each recess has a bottom wall and wherein a subsidiary recess is formed in the bottom wall of the first said recess.

11. A preform element according to claim 10, wherein the subsidiary recess is of corresponding shape to the first said recess, but is of smaller size.

12. A preform element according to claim 7, wherein each recess decreases in width as it extends away from the inner edge of the peripheral rebate.

13. A preform element according to claim 12, wherein a part of each recess which is of reducing width is at least partly curvilinear.

14. A preform element according to claim 13, wherein said part of each recess which is of reducing width is part-circular.

15. A preform element according to claim 13, wherein said part of each recess which is of reducing width is substantially semi-circular.

16. A preform element according to claim 1, wherein the element is circular in configuration and of substantially constant thickness.

17. A preform element according to claim 2, wherein the front surface of the substrate is formed with at least two stepped rebates extending around the periphery thereof, each having an inner wall and a bottom wall, each inner wall being formed with a plurality of circumferentially spaced recesses, the recesses in each inner wall being out of radial alignment with the recesses in the inner wall of an adjacent peripheral rebate.

* * * * *